CONVEYANCE LOADING APPARATUS

Filed April 14, 1967 6 Sheets-Sheet 1

INVENTORS
JOSEPH C. WOLLARD
JOHN S. SLANEY
LESTER L. PREISS

BY Slaney & O'Neil
ATTORNEYS

INVENTORS
JOSEPH C. WOLLARD
JOHN S. SLANEY
LESTER L. PREISS

BY Shanley & O'Neil
ATTORNEYS

Oct. 8, 1968 J. C. WOLLARD ET AL 3,404,417

CONVEYANCE LOADING APPARATUS

Filed April 14, 1967 6 Sheets-Sheet 3

INVENTORS
JOSEPH C. WOLLARD
JOHN S. SLANEY
LESTER L. PREISS

BY Shanley & O'Neil
ATTORNEYS

INVENTORS
JOSEPH C. WOLLARD
JOHN S. SLANEY
LESTER L. PREISS
BY
Shanley & O'Neil
ATTORNEYS

CONVEYANCE LOADING APPARATUS

Filed April 14, 1967 6 Sheets-Sheet 5

INVENTORS
JOSEPH C. WOLLARD
JOHN S. SLANEY
LESTER L. PREISS
Shanley & O'Neil
ATTORNEYS

CONVEYANCE LOADING APPARATUS

Filed April 14, 1967 6 Sheets-Sheet 6

INVENTORS
JOSEPH C. WOLLARD
JOHN S. SLANEY
LESTER L. PREISS

BY Shanley & O'Neil
ATTORNEYS

United States Patent Office 3,404,417
Patented Oct. 8, 1968

3,404,417
CONVEYANCE LOADING APPARATUS

Joseph C. Wollard, Miami Springs, John S. Slaney, Opa-locka, and Lester L. Preiss, Miami, Fla., assignors, by mesne assignments, to Wollard Aircraft Equipment, Inc., Miami, Fla., a corporation of Washington Continuation-in-part of application Ser. No. 326,771, Nov. 29, 1963. This application Apr. 14, 1967, Ser. No. 630,895
4 Claims. (Cl. 14—71)

ABSTRACT OF THE DISCLOSURE

A horizontally swingable conveyance loader pivoted adjacent a terminal building with mobile undercarriage supporting the swingable portion at a point spaced from the pivot adjacent the building, the undercarriage including a plurality of wheel assemblages, each wheel assemblage having coaxially mounted wheels, the axis of each wheel assemblage being rotatable around a point between the wheels both in horizontal and vertical planes, there being means for holding a plurality of said axes radially disposed relative to the pivot adjacent the building.

*Cross-references to related applications*

This application is a continuation-in-part of patent application Ser. No. 326,771, filed No. 29, 1963, now Patent No. 3,315,291, and is closely related to Patents Nos. 3,263,253 and 3,263,254 and patent applications Ser. Nos. 587,085 and 587,086, filed Oct. 17, 1966.

*Background of the invention*

The present invention relates to conveyance loading apparatus in general and more particularly to the type in which a gangway provides covered and weather-proof protection for passengers or freight between a building and a conveyance, the gangway being swingable around a point adjacent the building on a mobile undercarriage spaced from the building.

Prior art patents in this field are

| | |
|---|---|
| Good et al. | 2,688,761 |
| Henion | 2,700,169 |
| Read et al. | 2,875,457 |
| Golde et al. | 3,047,891 |
| Bolton | 3,110,048 |

*Description of the preferred embodiments*

Figure 1:
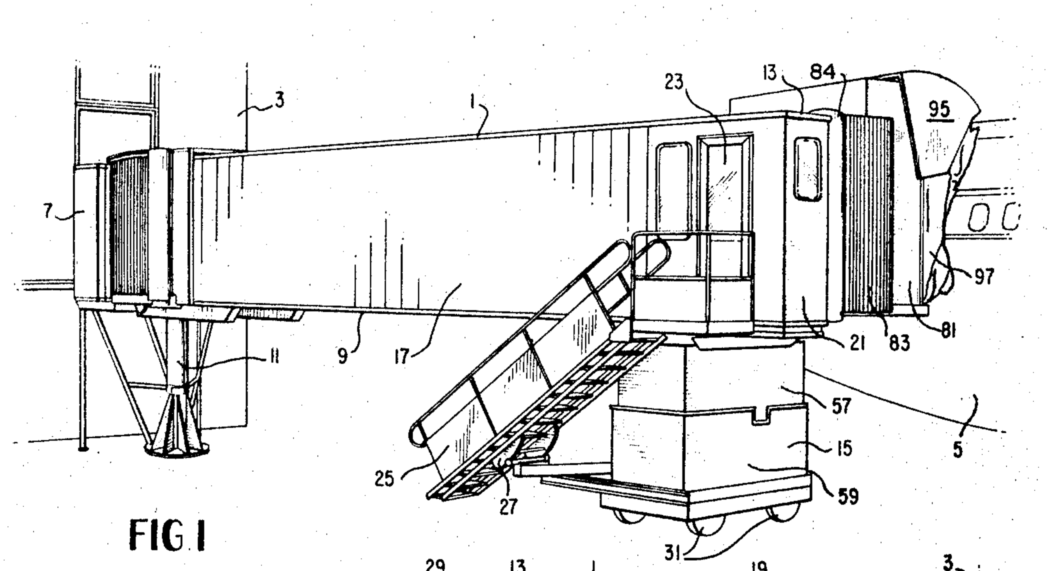
FIGURE 1 is a perspective view of a passenger gangway in operation between a passenger terminal and an aircraft.

Referring now to the drawings in greater detail, there is shown a passenger gangway 1 which is generally elongated and which extends between a fixed passenger terminal 3 such as an airport and a movable vehicle 5 such as an aircraft and shields passengers from the weather as they pass between the terminal and the vehicle. Gangway 1 has a fixed inner end portion 7 which is secured to the terminal and an elongated midportion 9 which occupies a principal portion of the length of the gangway. Midportion 9 is mounted for horizontal and vertical swinging movement on and relative to fixed inner end or terminal portion 7, by vestibule structure 8 which is described in greater detail below. For this purpose, an upright stand 11 is provided which supports at least a principal portion of the weight of terminal portion 7, vestibule structure 8 and midportion 9 of gangway 1 in the vicinity of the pivotal interconnection between these two latter portions.

At the other or outer or swinging end of gangway 1, there is a vestibule 13 adapted to register with a doorway of a vehicle such as an airplane. The vestibule is mounted on the outer end of midportion 9 for horizontal swinging movement, but not for vertical swinging movement, relative to midportion 9. At least a major portion of the weight of vestibule 13 and the free or swinging end of midportion 9 with which it pivotally interconnects is carried by a wheeled support 15 that is power driven to move in an arc at the center of which is the upright axis of swinging movement of midportion 9 on terminal portion 7.

Midportion 9 is enclosed on all sides to protect passengers from the weather, and includes a pair of opposite sidewalls 17 and 19 that extend substantially full length of midportion 9. As a passenger walks from the terminal toward the vehicle, sidewall 17 is on his right and sidewall 19 is on his left. Midportion 9 terminates in a fixed endwall 21 that extends from the outer end of sidewall 17 to the left as viewed by a passenger moving toward the vehicle, that is, from the outer end of sidewall 17 toward the vehicle. Adjacent endwall 21, a doorway 23 extends through sidewall 17 and gives access to the upper landing of a stairway 25 that descends from adjacent doorway 23 to ground level. Stairway 25 is of the articulated parallelogram linkage type, in which the step treads are pivotally interconnected with elongated stairway members at their front and rear edges to form sides of parallelograms, so that the step treads remain level no matter what the inclination of stairway 25. Wheeled support 15 is vertically extensible to vary the height of the upper end of stairway 25, with the result that the stairway will be inclined at different angles at different times. Nevertheless, the treads of stairway 25 will remain horizontal. To assure that the lower end of stairway 25 is adjacent ground level at all times regardless of the elevation of its upper landing, cams 27 are carried by the underside of stairway 25 and rest against members carried by the lower or inextensible portion of wheeled support 15, the shape of the cams being so related to the position of the upper end of the stairway as to maintain the elevation of the lower end of the stairway substantially constant.

Vestibule 13 faces generally to the left as seen by a passenger walking toward the vehicle. Access between the gangway and the vehicle is provided by a plurality of doors 29, best seen in FIGURE 2, which face generally in that direction. Doors 29 are of an overall width, that is, a dimension lengthwise of the gangway, which is substantially greater than is necessary simply for the use of the passengers. This is because the gangway of the present invention is inextensible; that is, the vertical axis about which midportion 9 swings relative to terminal portion 7 and the vertical axis about which vestibule 13 swings relative to midportion 9 are a fixed distance apart and this fixed distance does not vary. The vertical axis at the inner end of the gangway remains always vertical, while that of the outer end of the gangway tilts somewhat as midportion 9 and vestibule 13 swing together vertically relative to fixed inner end or terminal portion 7. Apart from this, however, the relationship of these two axes is fixed. It is for this reason that the total width of doors 29 is greater than usual, so that variations in the position of the vehicle can be accommodated not by extension of the gangway as in the prior art, but rather by the fact that doors 29 are wide enough to provide a substantial margin of error in the placement of the vehicle for loading or unloading.

Turning now to the vehicle structure of wheeled support 15, and with particular reference to FIGURES 5–10, it will be seen that the wheeled support is supported by four wheels 31 that in turn are mounted on a horizontal underframe 33. The wheels are mounted in pairs, the wheels of each pair being coaxial. Each pair of wheels 31 is carried by a generally transversely extending bolster 35 which is interconnected with underframe 33 for relative horizontal swinging movement about a vertical axis disposed about midway of the length of each bolster 35. To this end, each underframe carries a depending horizontal pivot plate 37 and each bolster carries on its upper side a corresponding horizontal pivot plate 39, the pivot plates 37 and 39 being pivotally interconnected for horizontal swinging movement relative to each other about an upright bolt. The lower pivot plate 39, in turn, is mounted on bolster 35 for vertical swinging movement about a horizontal axis disposed intermediate the length of bolster 35, by means of a pair of bearing plates 40, 40 and a horizontal pivot bolt 41. By this arrangement, the inclination of underframe 33 relative to bolsters 35 can be adjusted by manipulation of screw jacks 43 by which underframe 33 is adjustably supported adjacent each end of each bolster 35.

Figure 5:
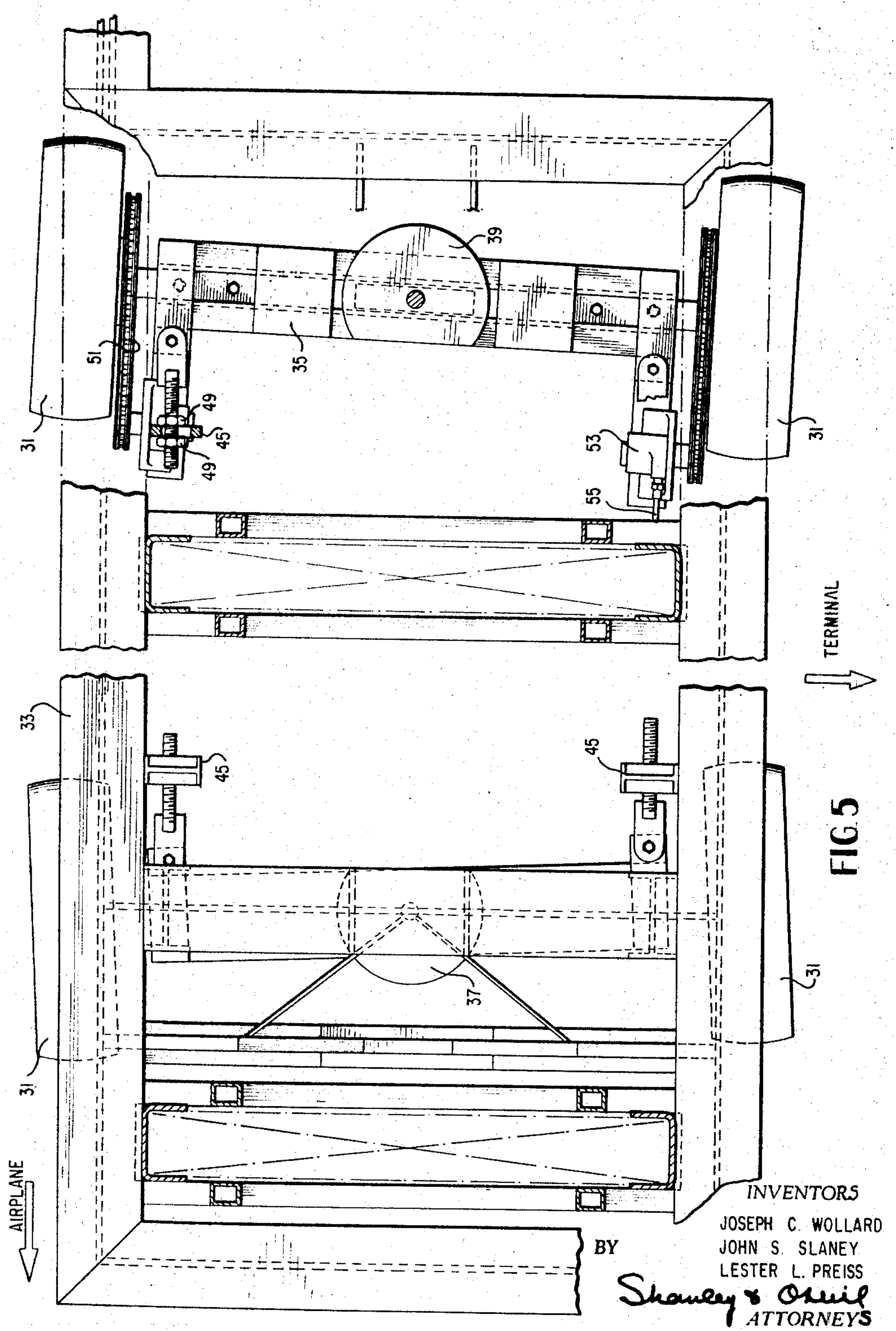
FIGURE 5 is a fragmentary plan view of the undercarriage and running gear of the wheeled support for the vehicle end of the apparatus of the prevent invention.
Figures 6, 7:
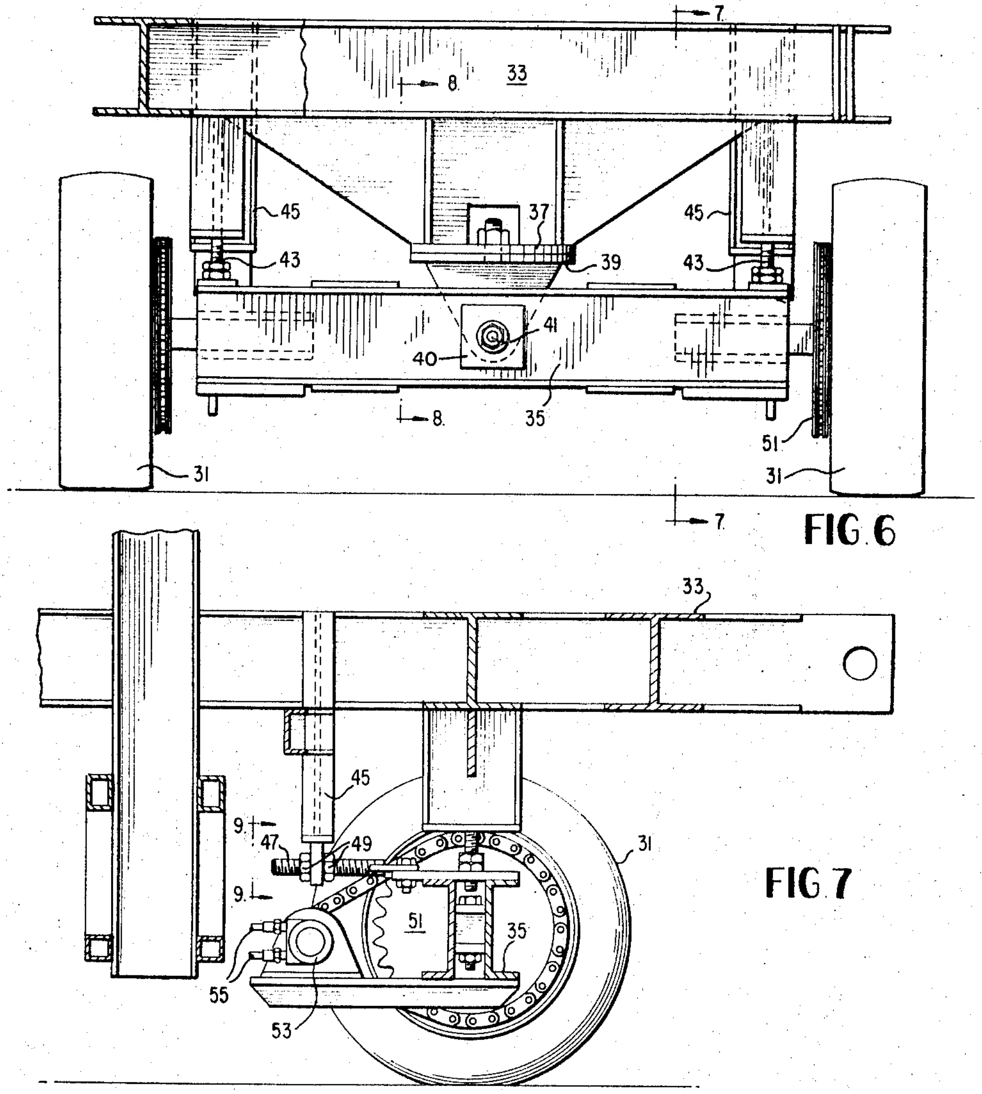
FIGURE 6 is an end elevational view of the running gear of the present invention.
FIGURE 7 is a fragmentary cross-sectional view taken on the line 7—7 of FIGURE 6.
Figure 8:
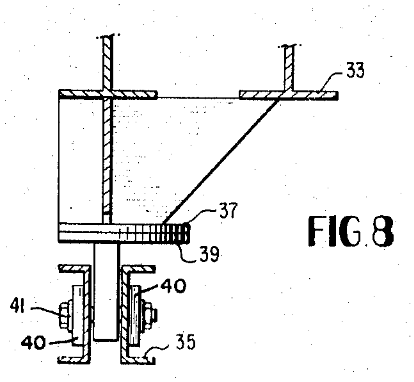
FIGURE 8 is a fragmentary cross-sectional view taken on the line 8—8 of FIGURE 6.
Figure 9:
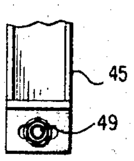
FIGURE 9 is a fragmentary view taken on the line 9—9 of FIGURE 7.

Members 45 also depend from both sides of underframe 33 adjacent each bolster 35 and have eyes through which are received screw-threaded arms 47 that are generally horizontally disposed and are pivotally interconnected at one end of each arm 47 to an end portion of each bolster 35. Nuts 49 are in screw-threaded engagement with screw-threaded arms 47 on either side of depending members 45 and manipulation of nuts 49 permits the attached end of bolster 35 to be drawn toward or pushed away from the associated depending member 45. In this way, the position of bolsters 35 can be adjusted about the vertical pivot of pivot plates 37 and 39, to any desired angular relationship as seen in FIGURE 5. Of course, if desired, only one assembly 45–49 can be provided for each bolster 35, instead of two as illustrated.

In operation, the positions of bolsters 35 will thus be adjusted by manipulation of nuts 49 on screwthreaded arms 47 so that the axes of all four wheels intersect the vertical axis of horizontal swinging movement of midportion 9 about terminal portion 7 of gangway 1. As seen in FIGURE 5, therefore, bolsters 35 will be so adjusted in position that they are not parallel to each other and so that the axes of some of the wheels 31 are disposed at an acute angle to the axes of some of the others of wheels 31. These adjusted positions of bolsters 35 are in turn fixed and maintained by nuts 49 on either side of depending members 45, so that wheels 31 are not free to swivel about any vertical axis but are free only to turn about their own axes. In this way, the only movement permitted to wheeled support 15 is arcuate movement about the axis of horizontal swinging of a major portion of gangway 1, so that wheeled support 15 imposes no longitudinal stress on gangway 1 by virtue of horizontal swinging movement of the gangway.

As mentioned above, the drive of wheeled support 15 is powered, and to this end, each wheel of at least one bolster is provided with a drive sprocket 51 about which a sprocket chain is trained that is driven from the relatively smaller drive sprocket of a fluid motor 53 to and from which fluid under pressure is conveyed by fluid lines 55 from a source of fluid under pressure (not shown).

The reason for the general arrangement of the parts adjacent the vehicle end of gangway 1 will now be clear. It will be noted from FIGURES 1, 5 and 10 that wheeled support 15 is elongated in its direction of travel, that is, elongated in a direction perpendicular to gangway 1. This relationship promotes stability of wheeled support 15 during its travel. At the same time, however, this relationship also coacts with the angular relationship of vestibule 13 to the length of midportion 9 of gangway 1. Moreover, the location of doorway 23 and stairway 25 is also important in relationship to the arrangement of wheeled support 15, for the arrangement of the upper landing of stairway 25, the outer end of midportion 9 and the vestibule 13 substantially in a line perpendicular to the length of gangway 1 makes it important that these parts be arranged as they are above wheeled support 15. In this way, it is feasible to provide a stairway 25 without further reinforcement of the overall structure. At the same time, vestibule 13 of gangway 1 does not interfere with doorway 23 and stairway 25, because they are on opposite sides of the outer end of midportion 9. By the same token, the provision of endwall 21 extending from sidewall 17, and the formation of sidewall 17 substantially longer than sidewall 19, provide a structure in which limited horizontal swinging movement of vestibule 13 relative to midportion 9 is made possible, between extreme positions in which vestibule 13 is disposed at an acute angle to the length of midportion 9.

Figure 10:
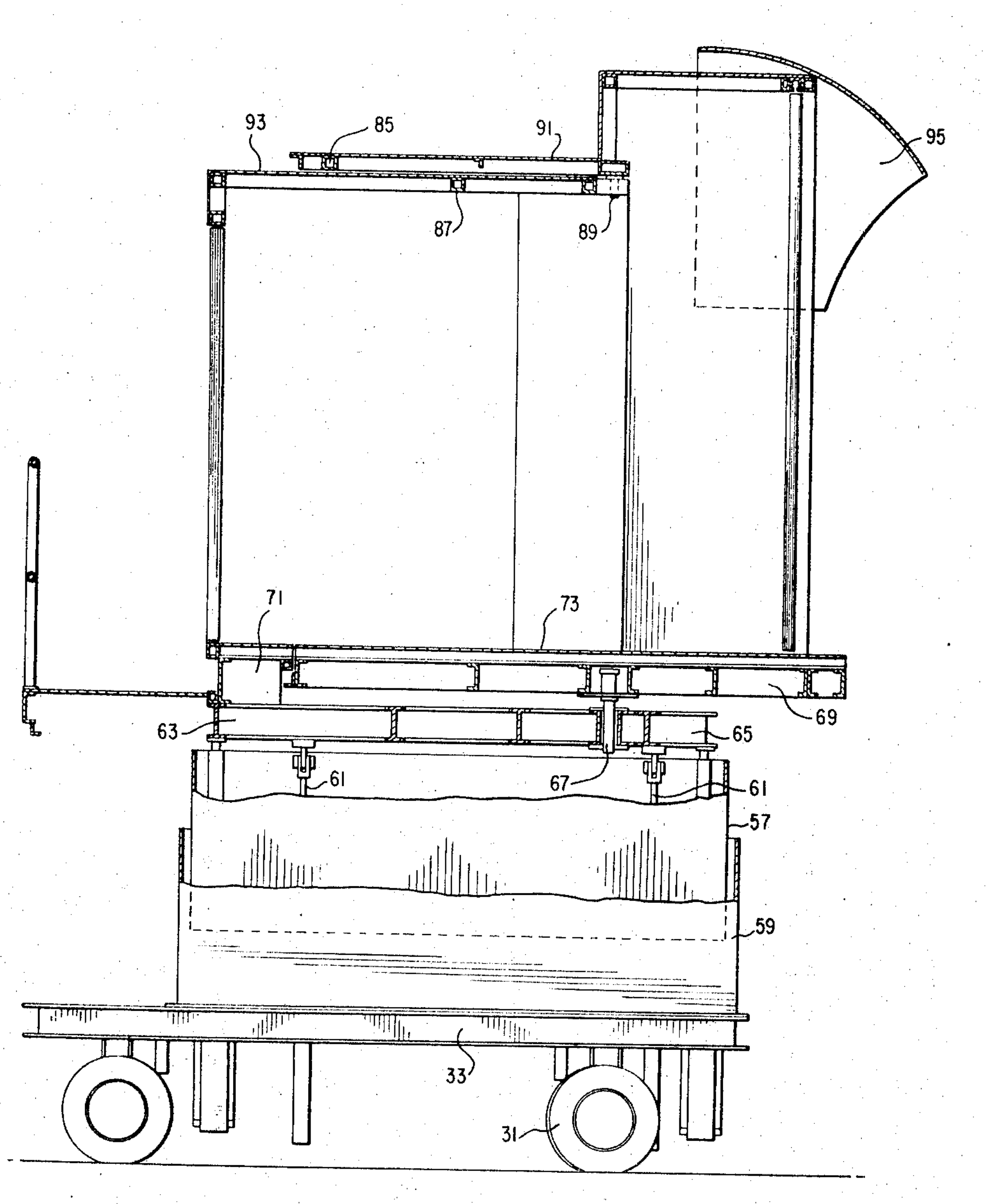
FIGURE 10 is a cross-sectional view in end elevation taken on the conveyance or aircraft end of the gangway of the present invention.

As perhaps can best be seen in FIGURE 10, wheeled support 15 is made up of a pair of vertically telescoping casing sections 57 and 59. Upper section 57 is movable relative to and telescopes within lower section 59. A lifting mechanism 61, indicated broadly in FIGURES 5 and 10, is provided for lifting the outer or swinging end of gangway 1 to cause it to swing vertically about its horizontal pivot adjacent fixed inner end portion 7 near the terminal building. Lifting mechanism 61 is described in greater detail in our Patent No. 3,263,253, to which reference is had for a more complete description of this portion of the apparatus so as to avoid the unnecesary inclusion of detail in the present application.

Lifting mechanism 61 acts between underframe 33 of wheeled support 15, which remains at constant elevation, and an underframe 63 of the free or swinging end of gangway 1. Underframe 63 can thus swing vertically with gangway 1. Underframe 63 is provided with a lateral extension 65 (FIGURE 10) that underlies vestibule 13. Lateral extension 65, in turn, carries a vertical pivot 67 on which vestibule 13 swings relative to midportion 9.

Pivot 67 is secured to a flooring frame 69 for vestibule 13. A fixed flooring frame 71 provides the flooring frame for elongated midportion 9. Flooring 73 of vestibule 13 is supported by flooring frame 69, while flooring 75 for elongated midportion 9 is supported by flooring frame 71. Flooring 73 is coplanar and flush with flooring 75. It is not necessary to close the crack between these flooring members, as they remain coplanar at all times although they swing relative to each other. The adjacent edges of flooring 73 and flooring 75 are arcuate about the axis of pivot 67, so that the track between flooring 73 and flooring 75 is neither enlarged nor reduced in size during the swinging of the vestibule relative to midportion 9.

Vestibule 13 includes upright sidewalls 81 fixed to frame 69 and flexible sidewalls 83 that interconnect sidewalls 81 with the relatively fixed walls of midportion 9 of gangway 1. Thus, there is a flexible sidewall 83 on each side of vestibule 13. Flexible walls 83 are preferably mounted on spring-tensioned rollers within casings 84, 84 carried by the adjacent edges of the relatively stationary walls of midportion 9. Thus, each flexible wall 83 is attached at its free end to an inner or rear edge of each sidewall 81.

Vestibule 13 is also provided with a roofing frame 85 that overlies the roofing frame 87 of midportion 9. The roofing frame 87 of midportion 9, in turn, has a lateral extension that carries a vertical pivot 89 by which roofing frames 85 and 87 are interconnected for relative pivotal movement. Pivot 89 is coaxial with pivot 67. Roofing 91 is carried by the swinging roofing frame 85, while roofing 93 is carried by the relatively fixed roofing frame 87. Roofing frame 85 and roofing 91 have a generally semicircular roof portion overlying the roof of midportion 9, so that the roof of vestibule 13 will be closed to the weather in all horizontally swung positions of vestibule 13.

The passenger gangway of the present invention is adapted for use with vehicles such as airplanes having doorways of various heights, as can be seen from the provision of means for adjusting the height of the free or swinging end of the passageway of the present invention. At the same time, it is recognized that the vehicles such as aircraft with which the present invention is used will not all have the same shape, that is, their passenger doorways will not be all at the same position on the aircraft nor will the aircraft adjacent the doorway be of uniform configuration. Therefore, provision is also made by the present invention for closing the passageway against the weather regardless of the shape of the vehicle being loaded or unloaded. To this end, a swinging hood 95 is provided that is carried above doors 29 and that has depending flexible curtains 97 that are secured to the lower portions of hood 95 and also to the forward or free edges of sidewalls 81. Hood 95 and curtains 97 thus surround and close the aircraft or other vehicle doorway from the weather before the passengers enter or leave the aircraft or other vehicle.

Figures 11, 12:
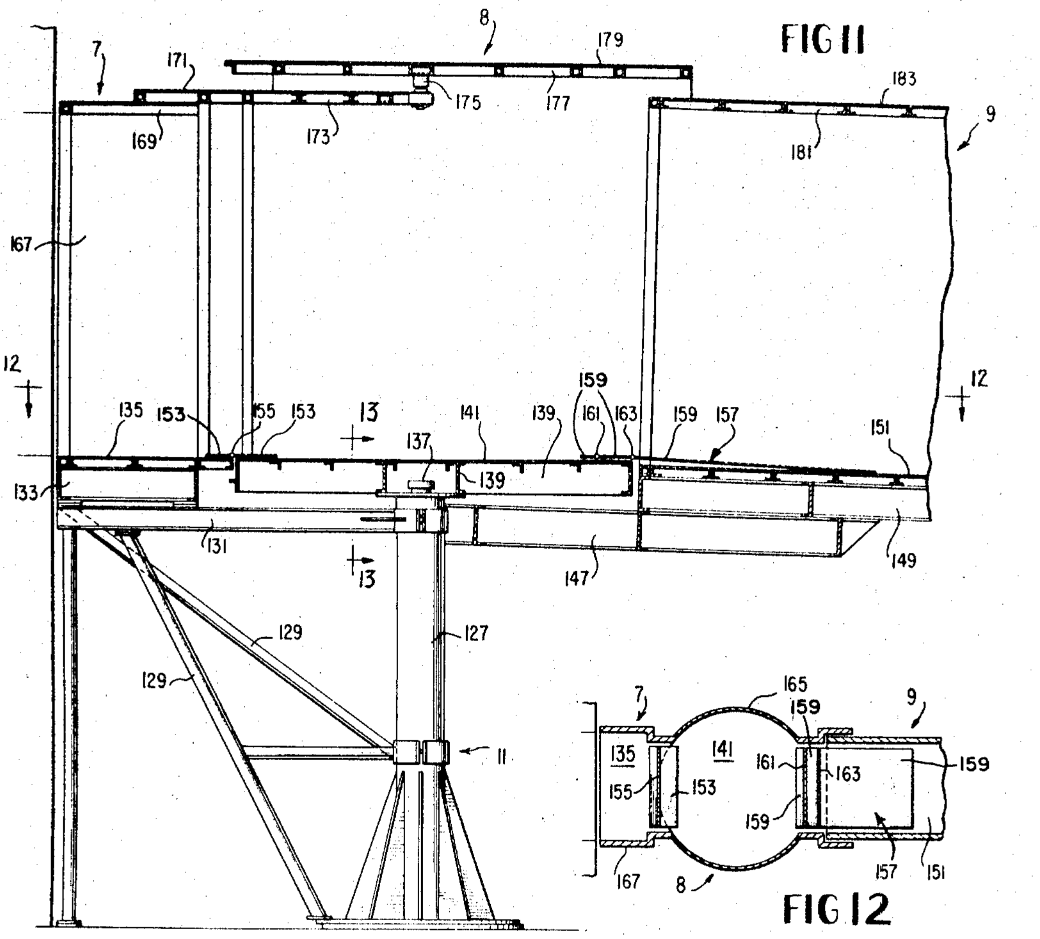
FIGURE 11 is an elevational view in section of the combined pivot and hinge structure at the terminal end of the gangway.
FIGURE 12 is a reduced cross-sectional plan view taken on the line 12—12 of FIGURE 11.
Figure 13:
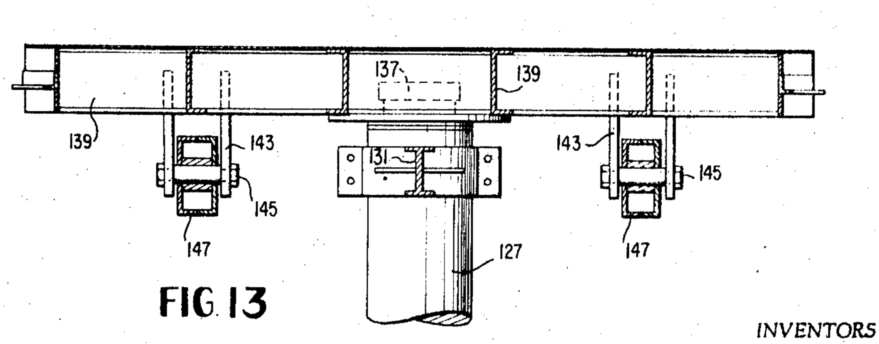
FIGURE 13 is an enlarged fragmentary cross-sectional elevational view taken on the line 13—13 of FIGURE 11.
Figures 14, 15, 16, 17:
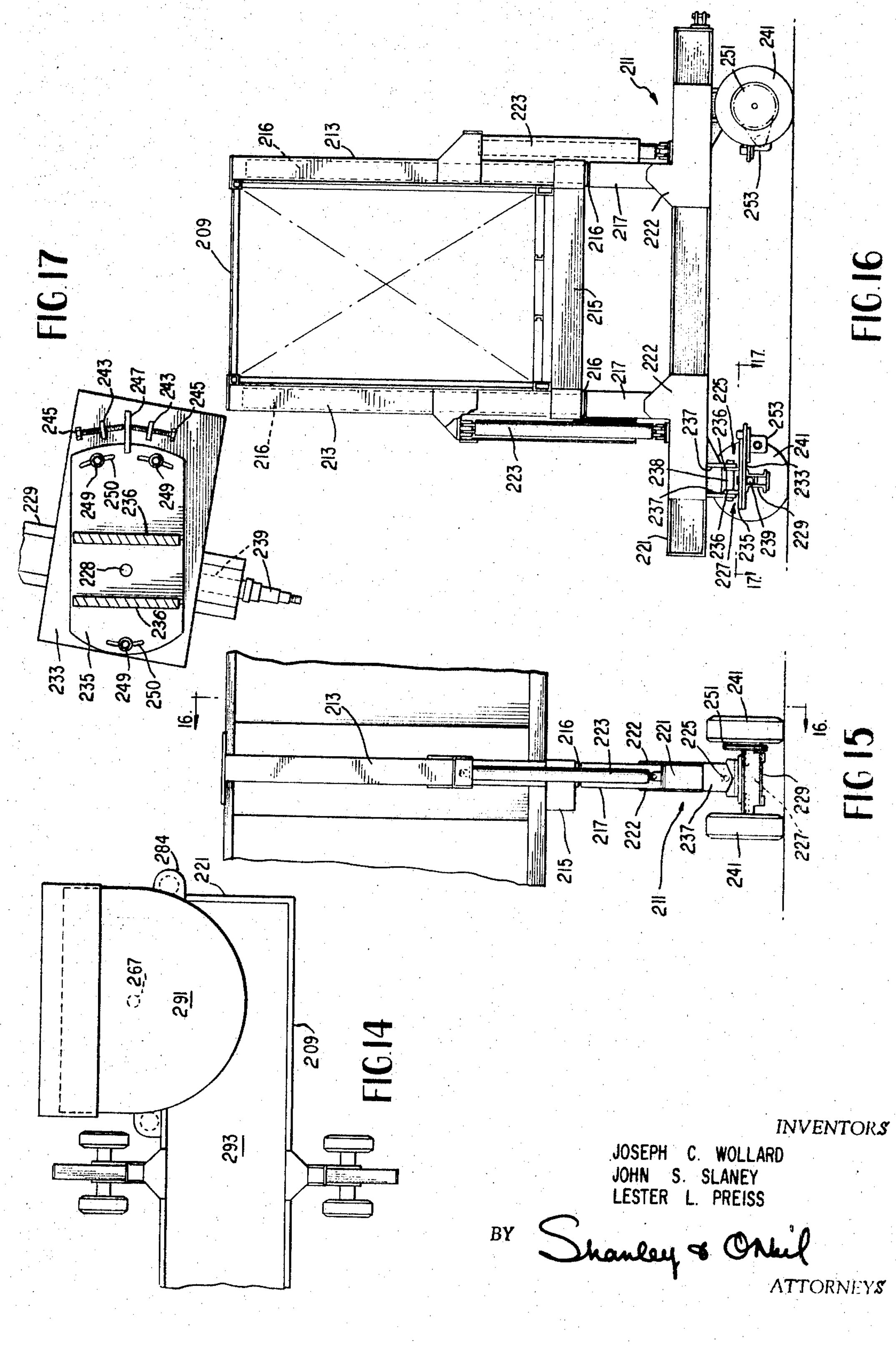
FIGURE 14 is a plan view of another embodiment of the present invention.
FIGURE 15 is a fragmentary side elevational view of the embodiment of FIGURE 13.
FIGURE 16 is a cross-sectional view in end elevation taken on the line 16—16 of FIGURE 15 with parts broken away.
FIGURE 17 is a fragmentary view taken on the line 17—17 of FIGURE 16.

Referring now to the horizontal and vertical swinging movement hinge connection between stand 11 and the gangway portions 8 and 9, as illustrated in FIGURES 11, 12 and 13, stand 11 is characterized by pedestal 127 that is rigidly interconnected with a plurality of diagonally extending braces 129 that extend between lower portions of the pedestal 127 and a generally horizontal underframe 131 for the terminal end of gangway 1.

Underframe 131 carries a flooring frame 133 of fixed inner end portion 7 of gangway 1. Flooring frame 133 in turn carries flooring 135 for the interior of the gangway.

As is best seen in FIGURE 11, pedestal 127 also carries, axially of itself, a vertical pivot 137 by which vestibule 8 is mounted for horizontal swinging movement relative to fixed inner end portion 7 about a vertical axis coaxial with pedestal 127. Pivot 137 carries a horizontal flooring frame 139 of vestibule 8. Flooring frame 139 is generally circular in plan and rotates always in a horizontal plane regardless of the adjusted position of gangway 1. Flooring frame 139 of vestibule 8 also carries horizontal flooring 141 that is flush and coplanar with the flooring 135 of flooring frame 133 of fixed inner end portion 7. Flooring 135 and 141 terminate adjacent each other in arcuate edges that have their centers at the axis of pivot 137. Thus, the crack between flooring 135 and flooring 141 can be relatively small and does not change in size with the movement of vestibule 8 relative to end portion 7, as the only movement of vestibule 8 is horizontal swinging movement about the vertical axis of pivot 137.

Two pairs of ears 143 are fixed to flooring frame 139 and depend therefrom. The pairs of ears are disposed on opposite sides of pivot 137. Ears 143 carry between them horizontal coaxial axles 145 the axes of which pass through the axis of pivot 137 and are perpendicular to the axis of pivot 137. Axles 145 carry generally horizontally disposed, outwardly extending arms 147 for vertical swinging movement thereon. Arms 147 at their outer ends support a generally horizontal flooring frame 149 for elongated outer portion 9. Flooring frame 149 carries flooring 151 which is generally horizontal. However, as elongated outer portion 9 swings vertically about the axis of axles 145, flooring 151 does not remain coplanar or flush with flooring 141 of vestibule 8.

Vestibule 8 and elongated outer portion 9 swing horizontally with each other. There is no horizontal swinging movement of one relative to the other. There is only vertical swinging movement of elongated outer portion 9 relative to vestibule 8. For this reason, and for other reasons that will soon appear, the crack between flooring 141 of vestibule 8 and flooring 151 of elongated outer portion 9 is straight and parallel to the axis of vertical swinging movement of elongated outer portion 9.

To close the crack between the flooring 135 of fixed inner end portion 7 and the flooring 141 of vestibule 9, a pair of bridge plates 153 are provided that are interconnected by a horizontal hinge 155 disposed perpendicular to the length of the gangway. Bridge plates 153 are thus enabled to swing relative to each other to accommodate any small irregularities in the contour of flooring 135 and 141 relative to each other.

Of considerably more significance is the fact that between flooring 141 of vestibule 8 and flooring 151 of elongated outer portion 9, a ramp 157 is provided so as to present to passengers a smooth and unbroken floor surface from vestibule 8 to elongated outer portion 9 regardless of the vertically swung position of elongated outer portion 9 relative to vestibule 8. Ramp 157 is comprised of at least three bridge plates 159 interconnected for vertical swinging movement relative to each other by a pair of horizontal hinges 161 and 163 that are parallel to each other and to the crack between the flooring 141 of vestibule 8 and the flooring 151 of elongated outer portion 9, and are also parallel to but spaced outwardly of and above the horizontal axis of vertical swinging movement of elongated outer portion 9. The arrangement and function of bridge plates 159 are quite important. Thus, as can be seen from a consideration of FIGURE 11, when elongated outer portion 9 is vertically swung to a position in which flooring 151 is lower than flooring 141, the outermost bridge plate 159 will simply swing downwardly as shown in FIGURE 11 about hinge 163. However, when elongated outer portion 9 is swung upwardly so that flooring 151 is higher than flooring 141, then the outermost bridge plate 159 tends to rest flat on flooring 151 while the two innermost bridge plates 159 tend to swing about hinges 161 and 163 to positions in which a smooth and unbroken flooring surface is nevertheless presented to the passengers.

Fixed inner end portion 7 is provided with a roof frame 169 that carries roofing 171. Fixed inner end portion 7 also has a forward extension 173 of its roof frame 169. Forward extension 173 carries a vertical pivot 175 that is swingably interconnected with a generally circular roof frame 177 of vestibule 8 for horizontal swinging movement of roof frame 177 relative to forward extension 173 about a vertical axis coaxial with pivot 137. Roof frame 177 overlies forward extension 173 and is covered by roofing 179 so that vestibule 8 is closed from the top against the weather.

Elongated outer portion 9 is provided with a roof frame 181 covered by roofing 183 which closes portion 9 to the weather. However, roof frame 181 is unconnected with roof frame 177, so that roof frame 181 can swing freely vertically with portion 9 relative to roof frame 177. It should be noted, however, that roofing 179 of vestibule 8 overlies roofing 183 of outer portion 9 a substantial distance lengthwise of the gangway so that the gap between vestibule 8 and outer portion 9 is closed to the weather in all vertically swung positions of outer portion 9 relative to vestibule 8. To this end also, roof frame 177 of vestibule 8 is spaced a substantial distance above roof frame 181 of outer portion 9.

Figures 2, 3, 4:
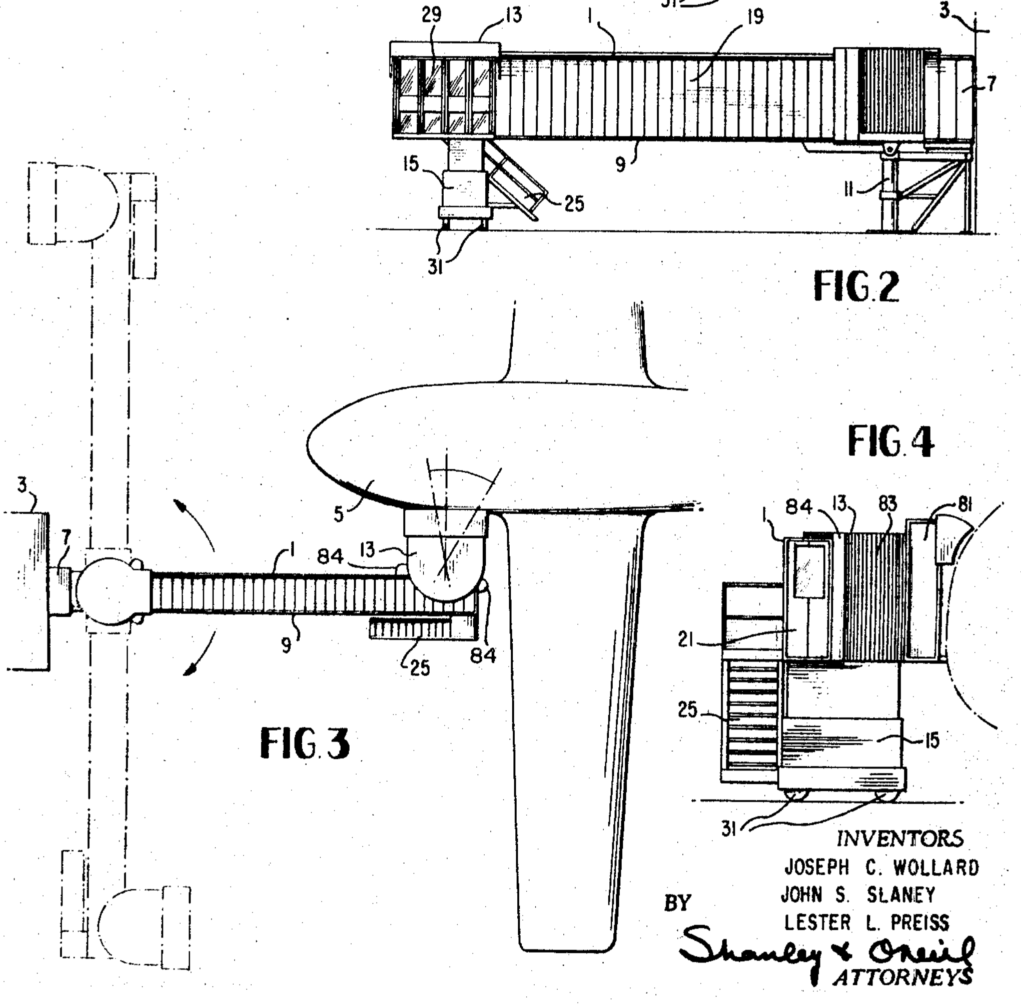
FIGURE 2 is a side elevational view of the structure shown in FIGURE 1, viewed from the vehicle or opposite side from FIGURE 1.
FIGURE 3 is a somewhat schematic plan view of apparatus according to the present invention, showing the range of adjustive positions of which the apparatus of the present invention is capable.
FIGURE 4 is an end elevational view of a gangway according to the present invention in use in connection with an airplane.

In use, therefore, it will be apparent that the gangway of the present invention can ordinarily be maintained in a position such as the lower broken line position shown in FIGURE 3 when no aircraft is to be loaded or unloaded. When an aircraft taxis adjacent the terminal building to receive or discharge passengers, the aircraft is stopped, for example, in the position shown in FIGURE 3. The various swung positions of gangway 1 and the extra width of doors 29 makes it possible to position the aircraft in any of a plurality of positions for cooperation with gangway 1.

With the aircraft at rest adjacent the terminal, the fluid motors 53 of wheeled support 15 are then actuated to drive the free end of gangway 1 into close adjacency with the passenger door of the aircraft. When gangway 1 has reached its full line positon in FIGURE 3, lifting mechanism 61 is actuated to raise or lower the free end of gangway 1 until flooring 73 and 75 is at an appropriate level, and vestibule 13 is swung horizontally by power means (not shown) until doors 29 are parallel to the aircraft doorway. Hood 95 and curtains 97 are positioned against the aircraft about the aircraft doorway to close the doorway from the weather, after which the aircraft doorway can be opened and passengers can pass back or forth between the aircarft and the teminal without having to descend stairs from the aircraft or be exposed to the weather. Similarly, crew members and aircraft or airport service personnel can freely pass between the interior and the exterior of the aircraft by using doorway 23 and stairway 25.

After the loading or unloading operation is complete, fluid motors 53 can simply be reversed so as to swing wheeled support 15 and the free end of gangway 1 back to a position of nonuse, such as the lower phantom line position of FIGURE 3.

A second embodiment of the present invention is illustrated in FIGURES 14 to 17, inclusive. In describing this embodiment, where practicable the same reference numerals plus 200 will be used as have been used in describing the previous embodiment, thereby minimizing the amount of verbal description necessary.

In this embodiment elongated midportion 209 is supported on a different form of a mobile undercarriage indicated generally at 211. To accomplish this the outer end of midpotion 209 is embraced by a framework made up of two identical vertical members 213, 213 and a horizontal framework member 215. Members 213 are open at their lower ends and telescopically receive two identical vertical guide members 216, 216, the lower ends of which are snugly received in a pair of identical open ended tubes 217, 217 which in turn have their lower ends rigidly welded intermediate the ends of an elongated underframe structure 221 disposed transversely of the longitudinal axis of elongated midportion 209. Identical reinforcing plates 222 on both sides of underframe 221 brace open-ended tubes 217 and 219 and form boxed-in portions on the underframe 221 in the regions of the underframe that carry the wheels.

The outer end of midportion 209 of the loader is movable up and down by virtue of telescopic movement of framework members 213 on guide members 216 and the motivation for this movement is supplied by hydraulic jacks 223. This part of the loader constitutes no part of the present invention but is more specifically disclosed in copending application Ser. No. 587,086, filed Oct. 17, 1966.

Referring again to undercarriage 211, this support structure includes wheel mounting means made up of horizontal pivot structures indicated generally at 225, vertical pivot structures indicated generally at 227 and truck frames bolsters 229.

In more detail, each truck frame bolster 229 carries a horizontal pivot structure made up of a pair of juxtaposed, face-to-face plates 233, 235 (FIG. 17) which are connected in pivotal realtionship by vertical pivot pin 228. Upper plate 235 carries a first pivot component made up of upwardly extending plates 236 and the underside of underframe 221 carries a second pivot component made up of a pair of suitably braced depending plates 237, plates 236 and plates 237 having registering openings receiving horizontal pivot pin 238, thereby forming the vertical pivot structure.

Each end of truck bolsters 229 includes a box-like member which receives and retains a wheel means in the form of a fixed axle 239 on which a wheel 241 is rotatably mounted.

In order to provide for a desired angular relationship of the truck bolsters during horizontal swinging movement of the loader, each plate 233 carries a pair of vertical threaded lugs 243 and coacting set screws 245. Each plate 235 carries a projecting vertical lug 247. By backing off one set screw 245 and advancing the other a fine adjustment can be obtained on the angularity of the truck bolster relative to the underframe 221. To anchor the truck bolster firmly in the desired angular position, plate 233 is provided with threaded openings to receive stud bolts 249 and plates 235 have arcuate slots 251 through which stud bolts 249 project. When the desired angularity of the truck bolsters has been achieved by set screws 245 stud bolts 249 are tightened to hold the two plates firmly in fixed relationship.

Since the relative rotation of plates 233 and 235 on pivot pin 228 normally takes place only when the loader is installed, as distinguished from the embodiment disclosed in copending application Ser. No. 587,085, each vertical pivot structure 227 can be of simple and economical construction. On the other hand, since in this modification underframe 221 rocks on pivot pins 238 as the midportion is raised and lowered, each horizontal pivot structure 225 is desirably built for heavy wear and can include any desirable antifriction means between the relatively movable parts. In the case of both pivot structures 225 and 227, pins passing through registering openings with any means for retaining the pins in place are suitable but due to the difference in functions of the pivots two juxtaposed face-to-face plates suffice in respect to the horizontal pivot structures 227 whereas spaced plates are provided for the vertical pivot structures 225 with two opposed plate surfaces (one thick plate in the prior modification) in engagement with them.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

We claim:

1. In a conveyance loading apparatus for connecting a building and a conveyance in which elongated passageway means are pivotally supported by first support means at the building end of the passageway means for swinging movement of the passageway means relative to the first support means in both horizontal and vertical planes and in which the passageway means are supported by a second support means at a point spaced along the length of the passageway means from the building end, the second support means including a mobile undercarriage means and an elevating means which together support the passageway means for swinging movement of the conveyance end thereof in horizontal and vertical planes, the mobile undercarriage means comprising:

(a) underframe means, (b) a plurality of spaced wheel mounting means carried by the underframe means, (c) bolster means forming part of each wheel mounting means, (d) a plurality of coaxially mounted rotatable wheels carried by each bolster means, (e) first pivot means forming part of the wheel mounting means mounting each bolster means for pivotal movement of the bolster means in a horizontal plane about a point intermediate the ends of the bolster means, (f) second pivot means forming part of the wheel mounting means mounting each bolster means for pivotal movement of the bolster means in a vertical plane about a point intermediate the ends of the bolster means, and (g) adjustable means forming part of the wheel mounting means for positioning each bolster means with the coaxial axes of the wheels of such bolster means disposed in substantially coordinated relation to the coaxial axes of the wheels of each other bolster means to accommodate movement of the conveyance end of the passageway in a horizontal plane.

2. The combination set out in claim 1 including locking means forming part of the wheel mounting means for locking the bolster means in the position in which the coaxial axes of the wheels are disposed substantially in a vertical plane which includes the vertical axis of the first pivot means.

3. The combination set out in claim 1 in which each first pivot means comprises a pair of juxtaposed, face-to-face plates one plate having connection with the associated bolster means, the other plate having connection with the underframe means, and the adjustable means acts to cause relative movement of the plates.

4. The combination set out in claim 1 in which each second pivot means comprises (a) a first pivot component including a pair of plates having opposed and spaced parallel surfaces, (b) a second pivot component including structural means positioned between the opposed and spaced surfaces of the first pivot component and presenting a first plate surface parallel to and facing one of the opposed and spaced surfaces of the first pivot component and presenting a second plate surface parallel to and facing the other of the opposed and spaced surfaces of the first pivot component, (c) means forming registering and aligned openings in the two plates and the structural means, and (d) pivot pin means pivotally connecting the first pivot component and the second pivot component for relative pivotal movement.

References Cited

UNITED STATES PATENTS

| | | | |
|---|---|---|---|
| 3,315,291 | 4/1967 | Wollard et al. | 14—71 |
| 2,015,891 | 10/1935 | Greiner et al. | 94—50 |
| 2,688,761 | 9/1954 | Good et al. | 14—71 |

JACOB L. NACKENOFF, *Primary Examiner.*